(12) United States Patent
Nagamatsu et al.

(10) Patent No.: US 7,977,410 B2
(45) Date of Patent: Jul. 12, 2011

(54) FINE PORE FORMATION AGENT FOR POROUS RESIN FILM AND COMPOSITION CONTAINING THE SAME FOR POROUS RESIN FILM

(75) Inventors: Makoto Nagamatsu, Hyogo (JP); Seiya Shimizu, Hyogo (JP); Hidemitsu Kasahara, Hyogo (JP); Hisakazu Hojo, Hyogo (JP)

(73) Assignees: Maruo Calcium Co., Ltd., Akashi-Shi (JP); Sumitomo Chemical Co., Ltd., Tokyo (JP)

( * ) Notice: Subject to any disclaimer, the term of this patent is extended or adjusted under 35 U.S.C. 154(b) by 99 days.

(21) Appl. No.: 12/162,893

(22) PCT Filed: Jan. 31, 2007

(86) PCT No.: PCT/JP2007/000043
§ 371 (c)(1),
(2), (4) Date: Jul. 31, 2008

(87) PCT Pub. No.: WO2007/088707
PCT Pub. Date: Aug. 9, 2007

(65) Prior Publication Data
US 2009/0030100 A1 Jan. 29, 2009

(30) Foreign Application Priority Data
Feb. 1, 2006 (JP) .................. 2006-024447

(51) Int. Cl.
*C08K 9/00* (2006.01)
*B32B 5/16* (2006.01)
*B29C 44/04* (2006.01)
(52) U.S. Cl. ........ 523/205; 428/402; 521/142; 264/45.1
(58) Field of Classification Search .................. 521/142; 523/205; 428/402; 264/45.1
See application file for complete search history.

(56) References Cited

U.S. PATENT DOCUMENTS

| | | | | |
|---|---|---|---|---|
| 3,844,865 A | * | 10/1974 | Elton et al. | 156/229 |
| 5,286,285 A | | 2/1994 | Meier et al. | 106/18.26 |
| 2008/0182933 A1 | * | 7/2008 | Shimizu et al. | 524/543 |

FOREIGN PATENT DOCUMENTS

| | | |
|---|---|---|
| EP | 0 568 488 A2 | 11/1993 |
| EP | 1 764 346 A1 | 3/2007 |
| JP | 2001-72890 | 3/2001 |
| JP | 2001-072890 * | 3/2001 |
| JP | 2001-72890 A1 | 3/2001 |
| JP | 2001-181423 * | 7/2001 |
| JP | 2001-181423 A1 | 7/2001 |
| JP | 2006-169421 | 6/2006 |
| JP | 2006-265472 A1 | 10/2006 |
| WO | WO 2005/077829 A1 | 8/2005 |

OTHER PUBLICATIONS

International Search Report for International Application No. PCT/JP2007/000043 dated Apr. 9, 2007.
International Search Report dated Apr. 9, 2007.
Supplementary European Search Report dated Sep. 29, 2010.

* cited by examiner

*Primary Examiner* — Randy Gulakowski
*Assistant Examiner* — Kara Negrelli
(74) *Attorney, Agent, or Firm* — Kratz, Quintos & Hanson, LLP

(57) ABSTRACT

A fine pore formation agent for a porous resin film is provided which comprises inorganic particles satisfying (a) $0.1 \leq D50 \leq 1.5$ (μm) (D50: average particle diameter of particles in 50% cumulative total by weight from the larger particle side by micro-track FRA), (b) $Da \leq 20$ (μm) (Da: maximum particle diameter by micro-track FRA), (c) $3 \leq Sw \leq 60$ (m²/g) (Sw: BET specific surface area measured by nitrogen adsorption method), (d) $Ir \geq 1.0 \times 10^5$ (Ω·cm) (Ir: volume resistivity (Ω·cm).

The fine pore formation agent for a porous resin film is capable of providing a resin composition giving a porous resin film useful in uses for electric parts such as capacitors and battery separators.

9 Claims, No Drawings

FINE PORE FORMATION AGENT FOR POROUS RESIN FILM AND COMPOSITION CONTAINING THE SAME FOR POROUS RESIN FILM

TECHNICAL FIELD

The present invention relates to a fine pore formation agent for a porous resin film and a composition containing the agent for a porous resin film. More particularly, the present invention relates to a fine pore formation agent for giving a porous resin film which is suitable for uses for electric parts such as capacitors and battery separators and a composition containing the fine pore formation agent for a porous resin film, since inorganic particles composing the fine pore formation agent for a porous film of the present invention scarcely contain coarse particles and thus prevent strength deterioration of the porous resin film, are capable of making the distribution width of the void diameter of the porous film uniform and controlling the void diameter, and contain an extremely small amount of conductive impurities.

BACKGROUND ART

A porous resin film made of a synthetic resin has been used as a filtration material for water purifiers, air purifiers and the like, synthetic paper, sanitary materials, medical materials, construction materials, air permeation sheets for agriculture, various kinds of separators for batteries, separators for electrolytic capacitors and the like and further it has been desired to improve and develop such a resin film for making the film thin while maintaining the strength of the porous resin film in all of these applications.

Particularly, in recent years, since a lithium secondary battery, which has been used in mobile appliances such as cellular phones and notebook type personal computers, has a high energy density for the volume and the weight as compared with nickel-hydrogen secondary battery or the like, production and consumption of the lithium secondary battery have been increasingly expanded since it was commercially made available in the beginning of 1990s.

Along with further improvements in the properties and capabilities of various kinds of the mobile appliances, the lithium secondary battery employed as a main power source has also been required to have improved properties and capabilities and similarly to both negative and positive electrodes, the physical properties of a separator made of a porous resin film are also required to give high capacity durability, safety, and the like.

A battery separator is required to be thinner and have a high porosity and high ventilation property, in addition to the electrically insulating property for both electrodes, which is an intrinsic property of the separator, since as the ion permeation is higher, the inner resistance is decreased and the properties of the battery are improved.

However, the insulating property, which is a function of the separator, and decrease of the inner resistance are contradictory and therefore they cannot be satisfied simply by making the separator thin, and it is required to give good size stability, wettability to an electrolytic solution, retention property, and corrosion resistance and to pay attention to chemical and electric insulation stability, excellencies of mechanical properties such as strength against penetration, workability at the time of rolling, cost and the like.

Additionally, in terms of safety, it is also very important that a separator for lithium secondary batteries is provided with a shut down function for stopping the battery reaction by increasing the temperature of the inside of the battery and thereby melting the resin and shutting its pores when an abnormal current is generated due to erroneous connection or the like.

For the above-mentioned requirements, presently, the thickness and the like of selectable resins and films have been limited for every application.

So far, porous films used as materials of sanitary products such as diapers and bed covers and clothing such as gloves have been used as separators for lithium secondary batteries.

However, researches and investigations of porous films more suitable to satisfy the above-mentioned requirements have been performed and a method was proposed for obtaining a porous film by mixing resin particles with an average particle diameter of 0.01 to 10 μm and a β-nucleating agent to polypropylene for obtaining a polypropylene composition, producing a film from the polypropylene composition, and stretching the film by rolls (refer to Patent Document 1).

Further, paying attention to stretching unevenness and dispersion of the pore size of a porous film in relation to the inner resistance of a battery, a method was proposed for obtaining a porous film with high evenness by adding as a filler a resin with high melt viscosity and low melt elongation to a thermoplastic resin, melting and kneading the mixed resin, and stretching the kneaded resin (refer to Patent Document 2).

Patent Document 1: Japanese Patent Application Laid-Open (JP-A) No. 9-176352

Patent Document 2: JP-A No. 2002-264208

DISCLOSURE OF THE INVENTION

Problems to be Solved by the Invention

However, porous resin films produced by conventional production methods are unsatisfactory in terms of the capacity and output required to be even higher, and are insufficient for the uses for large scale batteries and automotive batteries, which would be desired in future, and further improvements are required.

For example, with respect to the above-identified method of Patent Document 1, the inner resistance of a lithium battery using the porous film obtained by the method as a separator becomes high although the reason is unclear and therefore, the output obtained due to the improvement of both positive and negative electrodes is vainly consumed and the porous film is not satisfactory as the separator film.

In the case of producing a porous film by the method described in Patent Document 2, it becomes easy for organic particles used for the film to drop out of the film and it results in difficulty of keeping the diameter of the pores and the porosity as planed initially, and in the case the porous film is used for a battery separator, the porous film causes short circuiting and over discharge and therefore it is undesirable.

In the case where inorganic particles are added as a fine pore formation agent, for example, natural mineral type particles generally have a broad particle size distribution and in order to obtain inorganic particles with a particle size of a prescribed fineness or higher as a physical property, innovative crushing and classifying techniques have to be established. Further, in a chemical synthesis system, although a powder with a fine particle size of a prescribed fineness or higher may be obtained, the powder may possibly have a problem in terms of the dispersion stability of the particle size or may contain conductive impurities in terms of the purity in many cases, and it thus results in possibility of electric discharge of the battery or a risk of short circuiting due to over discharge, thus there are many problems to be solved.

The presently available methods for producing films having fine pores are classified into methods for forming fine pores (voids) among particles and resin by adding inorganic particles and carrying out uniaxial or biaxial stretching, methods for dissolving the particles themselves by an acid, an alkali or the like, and methods for forming fine pores by adding a wax-type additive which is easy to be extracted later to a thermoplastic resin and then removing the additive with a solvent such as an ether or the like. In any method, it is required to produce a porous film with little unevenness in size of the voids or pores to be formed therein and having voids uniformly distributed in the film plane.

In order to produce such a porous film, it is required for a fine pore formation agent in a resin composition for films to have good particle dispersibility, to have a sharp particle size distribution without being contaminated with coarse particles, and to contain little conductive impurities.

Means for Solving the Problems

The present inventors have made an extensive series of investigations to solve the above-mentioned problems and have found that inorganic particles adjusted by a specified method scarcely contain coarse particles and conductive impurities, are capable of forming fine pores in the case a resin composition for porous films which contains the particles as an additive for porous film formation is used for producing a film by uniaxial or biaxial stretching to thereby provide excellent film properties, for example, in the case the film is used as a separator for lithium secondary batteries and accordingly, the above-mentioned problems can be solved by the inorganic particles. These findings have now led to completion of the present invention.

That is, embodiment 1 of the present invention provides a fine pore formation agent for porous resin films containing inorganic particles, wherein the inorganic particles satisfy the following formulas (a) to (d):

$$0.1 \leq D50 \leq 1.5 (\mu m); \tag{a}$$

$$Da \leq 20 (\mu m); \tag{b}$$

$$3 \leq Sw \leq 60 (m^2/g); \text{ and} \tag{c}$$

$$Ir \geq 1.0 \times 10^5 (\Omega \cdot cm) \tag{d}$$

wherein

D50: average particle diameter ($\mu m$) of particles in 50% cumulative total by weight from the larger particle side in particle size distribution by laser diffraction spectrometry (micro-track FRA);

Da: maximum particle diameter ($\mu m$) in the particle size distribution by laser diffraction spectrometry (micro-track FRA);

Sw: BET specific surface area ($m^2/g$) measured by nitrogen adsorption method; and Ir: volume resistivity ($\Omega \cdot cm$) of hydrochloric acid-insoluble matter.

Embodiment 2 of the present invention provides the fine pore formation agent for porous resin films, wherein the inorganic particles are selected from calcium carbonate, calcium phosphate, magnesium hydroxide, and barium sulfate.

Embodiment 3 of the present invention provides the fine pore formation agent for porous resin films, wherein the inorganic particles are calcium carbonate.

Embodiment 4 of the present invention provides the fine pore formation agent for porous resin films, wherein the inorganic particles are surfaced treated with a surfactant (A) and a compound (B) having a chelating function to alkaline earth metals.

Embodiment 5 of the present invention provides the fine pore formation agent for porous resin films, wherein the inorganic particles satisfy the following formula (e):

$$1 \leq As \leq 4 (mg/m^2) \tag{e}$$

wherein

As: heat loss per unit specific surface area calculated according to the following equation [heat loss per 1 g of surface treated inorganic particles at a temperature in a range from 200° C. to 500° C. (mg/g)]/Sw ($m^2/g$).

Embodiment 6 of the present invention provides the fine pore formation agent for porous resin films, wherein the inorganic particles satisfy the following formula (f):

$$Hx \leq 500 (ppm) \tag{f}$$

wherein

Hx: hydrochloric acid-insoluble matter contained in 500 g of the fine pore formation agent.

Embodiment 7 of the present invention provides the fine pore formation agent for porous resin films, wherein the inorganic particles satisfy the following formula (g):

$$Fc \leq 30 (ppm) \tag{g}$$

wherein

Fc: hydrochloric acid-insoluble free carbon contained in 500 g of the fine pore formation agent.

Embodiment 8 of the present invention provides a composition for a porous resin film which comprises mixing the fine pore formation agent with a resin for a porous film.

Embodiment 9 of the present invention provides the composition for a porous resin film, wherein the resin for a porous film is an olefin type resin.

Embodiment 10 of the present invention provides the composition for a porous resin film, wherein the porous resin film is for a battery separator.

Effects of the Invention

Since the inorganic particles composing the fine pore formation agent for a porous film of the present invention scarcely contain coarse particles, the strength deterioration of the porous resin film hardly occurs and the distribution width of the void diameter of the porous film is made uniform and the void diameter can be controlled, and further, since conductive impurities are in an extremely little amount, in the case where the inorganic particles are added to a resin for a film, a porous resin film usable for uses as electric parts such as capacitors and battery separators can be obtained.

BEST MODES FOR CARRYING OUT THE INVENTION

Hereinafter, the present invention will be described in more detail.

The formulas (a) and (b) are indexes for informing the dispersion state of the fine pore formation agent for a porous resin film of the present invention (hereinafter, simply referred to as a fine pore formation agent in some cases).

In the formula (a), it is required that the average particle diameter (D50) measured by micro-track FRA is in a range from 0.1 to 1.5 $\mu m$. It is possible to control the average particle diameter (D50) to be smaller than 0.1 $\mu m$ in terms of a technique, however it is undesirable in terms of the cost. Further, if it exceeds 1.5 $\mu m$, the cohesive power of secondary particles, which are agglomerates of the primary particles, becomes high and the inorganic particles exist as being the secondary particles even in a resin and therefore the inorganic particles cannot be used for the purposes of the present invention. Among uses as a porous resin film, a film for use as a battery separator is particularly required to be thin and have high porosity and high ventilation property in order to improve the capabilities of the battery, and in terms of the insulation property and mechanical properties such as penetration strength, it is required for the inorganic particles to have dispersibility more close to that of the primary particles, and therefore the average particle diameter is preferably in a range from 0.1 to 1.0 µm and more preferably in a range from 0.1 to 0.7 µm.

In the formula (b), it is required that the maximum particle diameter (Da) measured by micro-track FRA is 20 µm or smaller. If the maximum particle diameter (Da) exceeds 20 µm, a problem that pores larger than aimed ones are formed is caused and therefore, such particles cannot be used for the purposes of the present invention. Among uses as a porous resin film, if a film for use as a battery separator has large pores, short circuiting tends to occur and it leads to generation of over discharge to increase a risk and therefore, the maximum particle diameter is preferably 15 µm or smaller and more preferably 7 µm or smaller.

The measurement method of the particle diameter distribution is as follows.

<Measurement Method>

Methanol is used as a medium for measurement by a micro-track FRA (laser diffraction type particle size distribution meter). Before the measurement, in order to suspend the fine pore formation agent of the present invention uniformly, as a pretreatment, an ultrasonic dispersion machine (US-300 T, manufactured by NIHONSEIKI KAISHA LTD.) is used for preliminary dispersion in specified conditions of 300 µA for 60 seconds.

The formula (c) defines the BET specific surface area (Sw) of the fine pore formation agent of the present invention measured by nitrogen adsorption method and Sw is required to be in a range from 3 to 60 $m^2/g$. In the case the specific surface area (Sw) is less than 3 $m^2/g$, the primary particles are too large and form pores larger than aimed pores when the agent is added to a film for a battery separator, and on the other hand, if it exceeds 60 $m^2/g$, it is undesirable in terms of the dispersibility and the agent cannot be used for the purposes of the present invention. Accordingly, the BET specific surface area is preferably in a range from 5 to 30 $m^2/g$ and more preferably in a range from 7 to 20 $m^2/g$. In the present invention, the BET specific surface area is measured by employing NOVA 2000 model manufactured by YUASA-IONICS COMPANY, LIMITED.

The formula (d) defines the volume resistivity (Ir), which is a numerated value of the insulation property of hydrochloric acid-insoluble matter of the fine pore formation agent of the present invention, and the volume resistivity (Ir) of the hydrochloric acid-insoluble matter of the fine pore formation agent is required to be $1.0 \times 10^5$ ($\Omega \cdot cm$) or higher. If the volume resistivity of the hydrochloric acid-insoluble matter of the fine pore formation agent is less than $1.0 \times 10^5$ ($\Omega \cdot cm$), inner discharge is caused in the case of using the agent for porous resin films, especially for a battery separator, and therefore, the agent cannot be used for the purpose of the present invention. Accordingly, it is preferably $1.0 \times 10^6$ ($\Omega \cdot cm$) or more and more preferably $1.0 \times 10^7$ ($\Omega \cdot cm$) or more.

The measurement method of the volume resistivity in the present invention is as follows.

<Measurement Method>

The volume resistivity is measured for a cell (a tablet) obtained by adjusting the density in a manner that the volume ratio of the hydrochloric acid-insoluble matter contained in the fine pore formation agent is adjusted to be about 65%, and by carrying out the measurement by using the cell and a high resistance meter (4339B, manufactured by Agilent Technologies, Inc.) at a voltage of 5 V.

Sampling of the hydrochloric acid-insoluble matter is carried out by wetting the fine pore formation agent in a proper amount of methanol (extra-high grade reagent) and adding 37% hydrochloric acid (extra-high grade reagent) for dissolving the fine pore formation agent. Successively, the obtained solution is filtered by Omni-Pore Membrane with a pore size of 10 µm (manufactured by MILLIPORE Corporation). In the case the fine pore formation agent is surface treated with a surface treatment agent, it is required to sufficiently wash the filter with ether or methanol since the surface treatment agent remains on the filter after the filtration. Thereafter, the agent is dried and weighed to sample the hydrochloric acid-insoluble matter.

The fine pore formation agent of the present invention are exemplified by calcium carbonate, barium sulfate, magnesium hydroxide, calcium phosphate, talcite compound, basic magnesium carbonate, silica, titanium oxide, aluminum hydroxide, boehmite, alumina, talc, and clay. In the case of using the agent particularly for a battery separator, in terms of the insulation property, divalent metal-type compounds such as calcium carbonate, calcium phosphate, magnesium hydroxide, and barium sulfate are preferable and as described above, chemically synthesized products are preferable in terms of the particle size and the purity of inorganic particles. A preferable production method of a divalent metal-type compound will be described as follows.

A synthesis method of calcium carbonate is generally a carbonation process which involves reaction of lime milk obtained by adding water to quick lime obtained by firing limestone with carbonic acid gas emitted at the time of the firing to give calcium carbonate in the form of fine particles with a uniform particle diameter and a shape of primary particles. Further, in accordance with the conditions at the time of the reaction and the process after the reaction, the particle size adjustment and coarse particle removal can be carried out, and the method is thus economical in terms of the physical property of the obtained particles and excellent in the reduction of a load on the environments, and suitable for uses for a battery separator.

In the case of using the calcium carbonate for uses for a battery separator, it is preferable to select limestone, a starting material, in consideration of the impurity. At the time of firing, as the fuel, generally coke, crude oil, light oil, kerosene, or the like is used, and if it is allowed from the viewpoint of cost, light oil and kerosene is preferably used as the fuel from the viewpoint of decreasing hydrochloric acid-insoluble matter and conductive foreign substances.

The lime milk and the calcium carbonate particles obtained by the reaction of lime milk are preferably subjected to classification based on gravitational decantation, centrifugation, and flotation and removal using a sieve, a filter or the like in order to remove impurities and coarse particles when the particles are in the state of a water slurry.

Further, it is also preferable that calcium carbonate obtained after drying and pulverization or a surface treated calcium carbonate powder is subjected to classification by air classification or the like to remove agglomerates generated during the drying step.

Additionally, dust and powder (of carbon and fine metals) in atmospheric air to be used in air classification, drying, or in the pneumatic transportation for production steps are affecting factors in the case of producing insulating inorganic particles. Therefore, it is effective to take a countermeasure of removing them by various kinds of filters.

A synthesis method of calcium phosphate is preferable to involve reaction of lime milk and phosphoric acid to produce fine particles. It is made possible to adjust the particle size by hydrothermal synthesis using an autoclave. The steps of drying and powdering thereafter may be the same as those in the above-mentioned calcium carbonate synthesis method. It is also preferable to carry out the same countermeasures as described above in the case of calcium carbonate for adjustment of the lime milk and the following impurity removal.

A synthesis method of magnesium hydroxide preferably involves reaction of lime milk or sodium hydroxide with bittern of seawater in terms of production of fine particles. Similarly to the above-mentioned case of calcium phosphate, it is made possible to adjust the particle size by hydrothermal synthesis using an autoclave. It is preferable to carry out the drying and powdering steps and impurity removal countermeasures in the above-mentioned manner after auxiliary salts such as calcium chloride contained in a magnesium hydroxide water slurry are washed out with water.

A synthesis method of barium sulfate preferably involves reaction of barium sulfide obtained by firing heavy crystal with an aqueous Glauber's salt solution in terms of production of fine particles. After the reaction, similarly to the above-mentioned case of magnesium hydroxide, it is preferable to carry out the drying and powdering steps and impurity removal countermeasures in the above-mentioned manner following the hydrothermal synthesis and removal of auxiliary salts such as sodium sulfide by washing with water.

Among the above-exemplified divalent metal-type compounds, calcium carbonate can be particularly safely, simply, and economically produced in the steps up to drying and powdering, has high acid-solubility, and scarcely affects a resin film, and therefore calcium carbonate is the most preferable fine pore formation agent.

As a more preferable embodiment of the present invention, it is advantageous to carry out a treatment with various kinds of surface treatment agents in order to improve not only the dispersibility of the fine pore formation agent but also to give compatibility with a resin and dispersibility in a resin. Surface treatment agents and treatment methods are not particularly limited, and the surface treatment may be properly carried out using a common treatment agent by a conventional method. For example, as a treatment method for improving the dispersibility of a resin and suppressing agglomerate formation in a resin film, there is a method as described in JP-A No. 2000-313824 using a surfactant (A) and a compound (B) having a chelating function to alkaline earth metals in combination.

Examples of the surfactant (A) to be used in the present invention are saturated fatty acids, unsaturated fatty acids, alicyclic carboxylic acids, resin acids and their salts; ester- and alcohol-type surfactants; sorbitan fatty acid esters; amide- and amine-based surfactants; polyoxyalkylene alkyl ethers; polyoxyethylene nonyl phenyl ethers; α-olefin sulfonic acid sodium salts; long chain alkyl amino acids; amine oxides; alkylamines; quaternary ammonium salts. These compounds may be used alone or in combination of two or more, if necessary.

Examples of saturated fatty acids are capric acid, lauric acid, myristic acid, palmitic acid, and stearic acid: examples of unsaturated fatty acids are oleic acid, linoleic acid, and linolenic acid: examples of alicyclic carboxylic acids are naphthenic acids having carboxyl groups at terminals of a cyclopentane ring or a cyclohexane ring: and examples of resin acids are abietic acid, pimaric acid, and neoabietic acid.

Examples of alcohol-type surfactants are alkyl sulfuric acid ester sodium salt and alkyl ether sulfuric acid ester sodium salt: examples of sorbitan fatty acid esters are sorbitan monolaurate and polyoxyethylene sorbitan monostearate: examples of amide- and amine-based surfactants are fatty acid alkanol amide and alkylamine oxides: examples of polyoxyalkylene alkyl ethers are polyoxyethylene alkyl ether and polyoxyethylene lauryl ether: and examples of long chain alkyl amino acids are lauryl betaine and stearyl betaine.

Examples of amine oxides are polyoxyethylene fatty acid amides and alkylamine oxides: examples of alkylamines are stearylamine acetate and the like: and examples of quaternary ammonium salts are stearyltrimethylammonium chloride and quaternary ammonium sulfate.

Examples of the salts of the above-mentioned various acids are salts of alkali metals such as potassium and sodium. Concrete examples are saturated fatty acid salts such as potassium laurate, potassium myristate, potassium palmitate, sodium palmitate, potassium stearate, and sodium stearate; unsaturated fatty acid salts such as potassium oleate and sodium oleate; alicyclic carboxylic acid salts such as lead naphthenate and lead cyclohexylbutyrate; and potassium abietate and sodium abietate.

Examples of the esters of the above-mentioned various acids are saturated fatty acid esters such as ethyl caproate, vinyl caproate, diisopropyl adipate, ethyl caprylate, allyl caprate, ethyl caprate, vinyl caprate, diethyl sebacate, diisopropyl sebacate, cetyl isooctanoate, octyldodecyl dimethyloctanoate, methyl laurate, butyl laurate, lauryl laurate, methyl myristate, isopropyl myristate, cetyl myristate, myristyl myristate, isocetyl myristate, octyl myristate, isotridecyl myristate, methyl palmitate, isopropyl palmitate, octyl palmitate, cetyl palmitate, isostearyl palmitate, methyl stearate, butyl stearate, octyl stearate, stearyl stearate, cholesteryl stearate, isocetyl isostearate, methyl behenate, and behenyl behenate; unsaturated fatty acid esters such as methyl oleate, ethyl linoleate, isopropyl linoleate, ethyl olive oleate, and methyl erucate; and additionally, examples include heat resistant special fatty acid esters such as long chain fatty acid higher alcohol esters; neopentyl polyol (including long chain and middle chain types) fatty acid esters and partially esterified compounds; dipentaerythritol long chain fatty acid esters; complex middle chain fatty acid esters, isocetyl 12-stearoylstearate, isostearyl 12-stearoylstearate, stearyl 12-stearoylstearate, beef tallow fatty acid octyl ester, fatty acid esters of polyhydric alcohol fatty acid alkyl glyceryl ethers; and aromatic esters such as benzoic acid esters.

The above-mentioned surfactants may be used alone or in combination of two or more, if necessary.

The fine pore formation agent surface treated with the various kinds of salts of saturated fatty acids, unsaturated fatty acids, alicyclic carboxylic acids, and resin acids among the above-mentioned surfactants does not affect or inhibit the insulation or heat resistance of a resin when being added to the resin and is provided with good dispersibility and therefore, the agent is preferable and particularly preferable to be treated with a mixture of alkali metal salts of the fatty acids.

With respect to the alkali metal salts of the fatty acids, a composition to be used preferably contains 50 to 98% by weight of alkali metal salts of linear fatty acids having 16 or more carbon atoms such as palmitic acid, stearic acid, arachidic acid and behenic acid, and 2 to 50% by weight of alkali metal salts of linear fatty acids having 10 to 14 carbon atoms such as capric acid, lauric acid and myristic acid. Alkali metals salts of linear fatty acids having 16 or more carbon atoms are preferably alkali metal salts of linear fatty acids having 18 or more carbon atoms such as stearic acid and oleic acid, and particularly preferably potassium salts of these linear fatty acids. With respect to the alkali metal salts of linear fatty acids having 10 to 14 carbon atoms, lauric acid with 12 carbon atoms is preferable in terms of dispersibility.

If the content of the linear fatty acids having 16 or more carbon atoms in the composition of the linear fatty acid alkali metal salts is less than 50% by weight, the dispersibility of the inorganic particles in the resin is slightly worsened as compared with the inorganic particles treated with the composition containing 50% by weight or more, although the reason is unclear. If it exceeds 98% by weight, the voids (fine pores) formed between the resin and the particles tend to be too small as compared with the inorganic particles treated with the composition containing 98% by weight or less, and therefore, it is not preferable. On the other hand, if the content of the linear fatty acids having 10 to 14 carbon atoms in the fatty acid composition is less than 2% by weight, the addition effect becomes insufficient as compared with that in the case the content is 2% by weight or more, and on the contrary, if the content exceeds 50% by weight, the affinity with the resin is deteriorated as compared with that in the case the content is 50% by weight or less, and problems such as whitening phenomenon and bleeding to the resin surface after formation tend to be caused and therefore, it is not preferable.

In the case the above-mentioned linear fatty acid alkali metal salts are used as the surfactant (A), it is preferable to select, mix, and adjust the respective fatty acids in the composition, and a commercialized soap or the like with a similar composition may be used unless the effects of the present invention are interfered.

The use amount of the surfactant (A) changes in accordance with the specific surface area of the inorganic particles and in general, the use amount is increased more as the inorganic particles have a higher specific surface area.

However, it is fluctuated depending on physical properties such as MI value of the resin to be a substrate of the porous film and conditions such as lubricant and the like to be added at the time of compounding, and therefore, it cannot be defined uniformly, however in general, the use amount is 0.1 to 15% by weight to the weight of the inorganic particles.

If the use amount is less than 0.1% by weight, it is difficult to obtain a sufficient dispersion effect and on the other hand, if it exceeds 15% by weight, bleeding of the surfactant to the porous film surface, decrease of the strength of the porous film and the like tend to be caused.

Examples of the compound (B) having a chelating function to alkaline earth metals and usable in the present invention are aminocarboxylic acid type chelating agents such as ethylenediamine tetraacetic acid, nitrilotriacetic acid, hydroxyethylethylenediamine triacetic acid, diethylenetriamine pentacetic acid, and triethylenetetramine hexaacetic acid; phosphonic acid type chelating agents such as hydroxyethylidene diphosphorous acid and nitrilotrismethylene phosphonic acid; water treatment agents containing aluminum compounds such as polyaluminum chloride; polycarboxylic acids such as polyacrylic acid and citric acid and their salts; copolymers of maleic acid and itaconic acid with polyacrylic acid and their salts; and phosphoric acids such as polyphosphoric acid and condensed phosphoric acid and their salts.

Examples of the polycarboxylic acid salts are polysodium acrylate and polyammonium acrylate: examples of the salts of copolymers are ammonium salts of copolymers of acrylic acid and maleic acid (weight ratio 100:80 or the like) and ammonium salts of copolymers of acrylic acid and methacrylic acid (weight ratio 100:80 or the like): examples of the phosphoric acid salts are sodium hexametaphosphate, sodium polyphosphate, and sodium pyrophosphate.

The above-exemplified compounds (B) having a chelating function to alkaline earth metals may be used alone or in combination of two or more, if necessary.

In the present invention, with respect to the compound (B) having a chelating function to alkaline earth metals, if the insulation property as high as that for a lithium secondary battery is required, polyphosphoric acids, condensed phosphoric acids, polycarboxylic acids, and their salts are preferable, and among others, cyclic condensed phosphoric acid or metaphosphoric acid is preferable.

As described in the case of the surfactant (A), the use amount of the compound (B) having a chelating function to alkaline earth metals changes in accordance with the specific surface area of the inorganic particles, the resin to be used, and the conditions at the time of compounding, and therefore, it cannot be defined uniformly. However, in general, the use amount is 0.05 to 5% by weight to the weight of the inorganic particles. If the use amount is less than 0.05% by weight, it is difficult to obtain a sufficient dispersion effect and on the other hand, if it exceeds 5% by weight, it is difficult to further improve the effect.

In the surface treatment with the above-mentioned surfactant (A) and compound (B) having a chelating function to alkaline earth metals, a surface treatment method to be employed may be a generally so-called dry treatment method involving directly mixing the surface treatment agents to a powder using a mixer such as a Super mixer or a Henshel mixer, optionally in a heating condition; a generally so-called wet treatment method involving dissolving the surfactant and compound (B) having a chelating function to alkaline earth metals in water or hot water, adding the obtained solution to a water slurry containing calcium carbonate for surface treatment and then carrying out dewatering and drying; and a method combining both methods. In terms of the treatment extent of the calcium carbonate particle surfaces and the cost, typically the wet treatment method alone is preferably employed.

As a more preferable embodiment of the present invention, it is preferable to satisfy the following formula (e):

$$1 \leq As \leq 4 (mg/m^2) \tag{e}$$

wherein

As: heat loss per unit specific surface area calculated according to the following equation [heat loss per 1 g of surface treated inorganic particles at a temperature in a range from 200° C. to 500° C. (mg/g)]/Sw (m²/g).

As denotes the heat loss, that is, the amount of the surface treatment agent, and as described above, the surface treatment agent amount in the fine pore formation agent of the present invention changes in accordance with the specific surface area of the inorganic particles, the type of the surface treatment, the resin to be used, and the compounding condition and therefore, it cannot be defined uniformly. However, in general, it is preferably in a range from 1 to 4 mg/m² as the surface treatment agent ratio (As).

If As is less than 1 mg/m², it is difficult to cause a sufficient dispersion effect and on the other hand, if it exceeds 4 mg/m², not only no further improvement effect can be obtained, but also it may cause isolation of the surface treatment agent or the resin component due to the excess treatment agent. Accordingly, it is more preferably in a range from 2 to 3.5 mg/m².

A measurement method of the surface treatment ratio is as follows.

<Measurement Method>

Using a thermobalance (TG-8110 model, manufactured by Rigaku Corporation), about 10 mg of a sample is put on a sample pan with a diameter of 10 mm (made of platinum) and the heat loss is measured by heating at 15° C./minute in a temperature range from 200 to 500° C. and the heat loss (mg/g) per 1 g of the surface treated inorganic particles is calculated, and the calculated value is divided by the BET specific surface area (m$^2$/g).

As a preferable embodiment of the present invention, it is preferable to satisfy the following formula (f) as an index of the amount of impurities of the fine pore formation agent:

$$Hx \leq 500 \text{(ppm)} \tag{f}$$

wherein

Hx: hydrochloric acid-insoluble matter contained in 500 g of the fine pore formation agent.

The formula (f) shows the impurity amount in the fine pore formation agent as the hydrochloric acid-insoluble matter, and in the case of the porous film particularly for a battery separator, not only the pores but also the carbon amount as a conductive impurity becomes a problem, the hydrochloric acid-insoluble matter (Hx) is preferably 500 ppm or less, more preferably, 300 ppm or less, and even more preferably 150 ppm or less. If it exceeds 500 ppm, as described above, it may become a cause of short circuiting and firing in the uses for a battery separator.

A measurement method of the hydrochloric acid-insoluble matter is as follows.

<Measurement Method>

The hydrochloric acid-insoluble matter contained in 500 g of the fine pore formation agent is measured. The measurement method of the hydrochloric acid-insoluble matter bases on the measurement method described in the above-mentioned formula (d).

As a more preferable embodiment of the present invention, it is preferable to satisfy the following formula (g):

$$Fc \leq 30 \text{(ppm)} \tag{g}$$

wherein

Fc: hydrochloric acid-insoluble free carbon contained in 500 g of the fine pore formation agent.

As described above, in the case of uses particularly for a battery separator, (free) carbon can be exemplified as a substance which is not dissolved in hydrochloric acid and tends to inhibit the insulation property of a battery separator. If the carbon amount contained in the fine pore formation agent exceeds 30 ppm, a risk of short circuiting is increased, therefore, it is preferably 10 ppm or less and more preferably 3 ppm or less.

A measurement method of the carbon amount is as follows.

<Measurement Method>

Void filtration is carried out in the same manner as the hydrochloric acid-insoluble matter measurement in the above-mentioned formula (d), except that the filter is changed to a piece of glass fiber filtration paper with a retaining particle diameter of 0.3 μm from Omni-Pore Membrane. After the filtration, the glass fiber filtration paper containing the dried hydrochloric acid-insoluble matter is subjected to free-carbon measurement by a high frequency induction heating furnace method (EMIA-320, manufactured by Horiba, Ltd.).

Further, with respect to the content of carbon, as described above, contamination of the carbon from the atmospheric air is significant, and particularly in the fine pore formation agent manufacture, it is preferable to take a countermeasure in the drying step and an atmospheric air suction step in a packaging work. Practically, generally a removal method using various kinds of filters can be employed. The filter diameter is not particularly limited, however it is generally possible to use a filter with a filter diameter of 0.1 to 100 μm. If the filter diameter is smaller than 0.1 μm, the filter is clogged and has to be replaced frequently, and therefore, it is not practically applicable, and on the other hand, if it exceeds 100 μm, impurities in the atmospheric air are possibly easily passed through. The filter diameter is more preferably 0.3 to 50 μm.

The fine pore formation agent for a porous resin film which contains the surface treated inorganic particles obtained in the above-mentioned manner is mixed with various kinds of resins, particularly an olefin type resin among thermoplastic resins to give a composition for a porous resin film, and is preferably used for producing porous films for various purposes and particularly for producing the porous film for a battery separator.

The resin to be used in the present invention is not particularly limited, and may include, for example, polyesters, polycarbonates, polyethylenes, polypropylenes, ethylene-propylene copolymers, and copolymers of ethylene or propylene with other monomers.

In the case of use for the porous film for a battery separator, polyolefin type resins such as polyethylene type and polypropylene type are preferable in terms of giving of shut down function, handling property at the time of battery production, and cost, and among them, ethylene type resins are more preferable.

The mixing ratio of fillers for the porous film and these resins is not particularly limited, and considerably differs in accordance with the types and uses of the resins, desired physical properties and the cost, and may be properly determined in accordance with these factors. In the case of uses for the separator film for a battery, the amount of the fine pore formation agent is usually 60 to 150 parts by weight and preferably about 80 to 120 parts by weight to 100 parts by weight of the resin.

In order to improve the properties of the film such as heat resistance, weather resistance, and stability, aramid fibers, a lubricant such as fatty acids, fatty acid amides, ethylene bis (stearic acid) amide, and sorbitan fatty acid esters; a plasticizer and a stabilizer; an antioxidant and the like may be added to an extent that the effect of the fine pore formation agent for a porous resin film of the present invention is not interfered. Further, it is also possible to add additives commonly used for a resin composition for a film such as a lubricant, an antioxidant, a heat stabilizer, a photostabilizer, a UV absorbent, a neutralization agent, an anti-fogging agent, an anti-blocking agent, an anti-static agent, a slipping agent, and a coloring agent.

In the case the fine pore formation agent for a porous resin film of the present invention and the above-mentioned various kinds of additives are mixed with a resin, generally, the mixture is heated and kneaded by a uniaxial or biaxial extruder, a kneader, or a Bumbury's mixer, and after the kneaded mixture is formed into a sheet by T die or the like, the sheet is successively uniaxially or biaxially stretched to produce a porous film product having fine pores.

Further, it is also allowed that a film is formed by using a conventionally known forming machine such as a T die and an inflation formation apparatus, and the fine pore formation agent for a porous resin film of the present invention is dissolved by an acid treatment to produce a porous film product having fine pores.

The resin may be in the form of pellets, powders (granules) with a desirably adjusted particle size and in the case of dispersion of the particles, it is preferable to use a powder-state resin in the dispersion of the particles and a mixing apparatus such as conventionally known mixers such as a Henshel mixer, a tumbler type mixer, and a ribbon blender.

The fine pore formation agent for a porous resin film of the present invention shows good physical properties such as dispersibility in a resin as compared with particles other than the present invention even if the agent is used in combination with a pellet-state resin, and the agent is particularly preferably used in mixing with a powder-state resin and additionally, in the case of mixing using a Henshel mixer, for example, the mixing can be carried out quickly. In addition, the agent has the following characteristics. That is, adhesion of the agent to inner wall faces and stirring or mixing blades of the mixer is scarcely caused, occurrence of the denatured resin and agglomerates induced by the adhesion in the mixer is reduced, the mixing workability is improved and occurrence of clogging of a strainer in a kneading extruder to be used in a post-treatment is suppressed.

The types and setting conditions of the above-mentioned heating and kneading apparatus vary and a feeding method of starting materials is properly determined in consideration of the dispersibility of the particles in the resin as well as the effect on MI value of the resin and the cost. In the case of mixing the fine pore formation agent for a porous resin film of the present invention with the resin, the type and setting condition of the apparatus are selected in consideration of the above-mentioned factors, and it is preferable to quantitatively feed a mixture obtained by mixing the agent with a resin powder in a proper particle size distribution by a Henshel mixer to a hopper of a kneader such as a biaxial kneader.

Between the mixing process and film formation, it is also possible to produce pellets, which are so-called a master batch, containing various kinds of additives such as the fine pore formation agent for a porous resin film of the present invention, thereafter mix a resin free from additives, and carry out melting and film formation. If necessary, a plurality of T-die extruders for the above process are overlaid, or a lamination process may be inserted in the stretching step to produce a multilayer film. Further, in order to carry out proper printing on the above-mentioned film, an ink-receiving layer may be formed on the film surface by a surface treatment with plasma discharge or the like.

EXAMPLES

Hereinafter, the present invention will be described in more detail by way of Examples, however it is not intended that the present invention be limited to the described Examples.

In the following description, % means % by weight unless otherwise specified.

Example 1

A quick lime obtained by firing a gray and dense limestone in a fluidized bed type kiln using kerosene as a heat source was dissolved to obtain a slaked lime slurry and reaction with carbonic acid gas was carried out to synthesize calcium carbonate. A water slurry containing the calcium carbonate was sieved with a sieve (400 mesh) to remove foreign matter and coarse particles and thereafter, the resulting calcium carbonate slurry was subjected to particle growth by Ostwald aging to obtain a water slurry containing 10% of calcium carbonate with BET specific surface area of 12 $m^2/g$.

Next, the following surfactant (A) and chelating compound (B) in amounts of 3.5% and 1.2%, respectively, to the amount of the calcium carbonate solid matter, were used for surface treatment to obtain a slurry of surface treated calcium carbonate.

Thereafter, dewatering, drying, and pulverization treatments were carried out and the obtained dry powder was classified by an air classification apparatus to obtain a surface treated calcium carbonate powder.

At the site where a large quantity of air for drying and air classification is required, in order to remove dust and powder (carbon and fine metals) from the air, cleaned air subjected to dust removal by a HEPA filter (dust removal efficiency: 99.99% at 0.3 μm) was used. The physical properties of the obtained surface treated calcium carbonate are shown in Table 1.

<Surfactant (A)=Mixed Soap>
Potassium stearate 65%
Sodium palmitate 20%
Sodium laurate 15%
<Chelating Compound B>
Sodium hexametaphosphate Example 2

The same process as the process of Example 1 was carried out to obtain a slurry of calcium carbonate with BET specific surface area of 35 $m^2/g$ and successively obtain surface treated calcium carbonate powder except that 1.0% of citric acid, which was a particle growth inhibitor to calcium hydroxide, was added in the synthesis of calcium carbonate by reaction of the slaked lime slurry and carbon dioxide gas, and that the addition amounts of the surfactant (A) and the chelating agent (B) were changed to 10% and 1.5%, respectively. The physical properties of the obtained surface treated calcium carbonate powder are shown in Table 1.

Example 3

The same process as the process of Example 1 was carried out to obtain a surface treated calcium carbonate powder, except that the addition amounts of the surfactant (A) and the chelating agent (B) were changed to 6.0% and 1.5%, respectively. The physical properties of the obtained surface treated calcium carbonate powder are shown in Table 1.

Example 4

The same process as the process of Example 1 was carried out to obtain a surface treated calcium carbonate powder, except that the air classification step was not carried out. The physical properties of the obtained surface treated calcium carbonate powder are shown in Table 1.

Example 5

The same process as the process of Example 1 was carried out to obtain a surface treated calcium carbonate powder, except that no chelating agent (B) was added and the dust removal filter was changed to a 10 μm simple filter (collection efficiency: 90 to 92%) from the HEPA filter. The physical properties of the obtained surface treated calcium carbonate powder are shown in Table 1.

Example 6

The same process as the process of Example 1 was carried out to obtain a surface treated calcium carbonate powder, except that the chelating compound (B) was changed to poly (ammonium acrylate) and no dust removal filter (HEPA) was used. The physical properties of the obtained surface treated calcium carbonate powder are shown in Table 1.

Example 7

The same process as the process of Example 1 was carried out to obtain a surface treated calcium carbonate powder, except that the step of removing foreign matter and coarse particles by a sieve and the air classification step were not carried out. The physical properties of the obtained surface treated calcium carbonate powder are shown in Table 1.

Example 8

The same process as the process of Example 1 was carried out to obtain a surface treated calcium carbonate powder, except that the step of removing foreign matter and coarse particles by a sieve, the air classification step and the dust removal filtration (HEPA) step were not carried out. The physical properties of the obtained surface treated calcium carbonate powder are shown in Table 1.

Example 9

The same process as the process of Example 1 was carried out to obtain a surface treated calcium carbonate powder, except that a shaft type kiln using coke in place of kerosene as a heat source was used. The physical properties of the obtained surface treated calcium carbonate powder are shown in Table 1.

Example 10

The same process as the process of Example 1 was carried out to obtain a surface treated calcium carbonate powder, except that a shaft type kiln using coke as a heat source was used and that the step of removing foreign matter and coarse particles by a sieve and the air classification step were not carried out. The physical properties of the obtained surface treated calcium carbonate powder are shown in Table 1.

Example 11

The same process as the process of Example 1 was carried out to obtain a surface treated calcium carbonate powder, except that no surfactant (A) was added. The physical properties of the obtained surface treated calcium carbonate powder are shown in Table 2.

Example 12

A quick lime obtained by firing a gray and dense limestone in a fluidized bed type kiln using kerosene as a heat source was dissolved to obtain a slaked lime slurry, and reaction with an aqueous phosphoric acid solution was carried out to synthesize calcium phosphate (hydroxyapatite). A water slurry containing the calcium phosphate was sieved with a sieve to remove foreign matter and coarse particles and thereafter, hydrothermal reaction was carried out in an autoclave in order to grow the particles of the calcium phosphate slurry to obtain a water slurry containing 10% of calcium phosphate with BET specific surface area of 58 $m^2/g$.

Thereafter, dewatering, drying, and pulverization treatments were carried out and successively the same process as the process in Example 1 was carried out to obtain a surface treated calcium phosphate powder, except that the treatment amounts of the surfactant (A) and the chelating compound (B) were changed to 15% and 2%, respectively. The physical properties of the obtained surface treated calcium phosphate powder are shown in Table 2.

Example 13

A quick lime obtained by firing a gray and dense limestone in a fluidized bed type kiln using kerosene as a heat source was dissolved to obtain a slaked lime slurry, and reaction with an aqueous sodium hydroxide solution was carried out to synthesize magnesium hydroxide. A water slurry containing the magnesium hydroxide was sieved with a sieve to remove foreign matter and coarse particles and thereafter, hydrothermal reaction was carried out in an autoclave in order to grow the particles of the magnesium hydroxide slurry to obtain a water slurry containing 10% of magnesium hydroxide with BET specific surface area of 15 $m^2/g$.

Thereafter, dewatering, washing with water, drying, and pulverization treatments were carried out and successively the same process as the process in Example 1 was carried out to obtain a surface treated magnesium hydroxide powder, except that the treatment amounts of the surfactant (A) and the chelating compound (B) were changed to 4% and 1.2%, respectively. The physical properties of the obtained surface treated magnesium hydroxide powder are shown in Table 2.

Comparative Example 1

The same process as the process of Example 1 was carried out to obtain a surface treated calcium carbonate powder, except that a shaft type kiln using coke as a heat source was used, that the step of removing foreign matter and coarse particles by a sieve, the air classification step, and dust removal step were not carried out, and that no chelating agent (B) was used. The physical properties of the obtained surface treated calcium carbonate powder are shown in Table 2.

Comparative Example 2

The same process as the process of Example 1 was carried out to obtain a slurry of calcium carbonate with BET specific surface area of 63 $m^2/g$ and successively obtain a surface treated calcium carbonate powder except that 3.0% of citric acid, which was a particle growth inhibitor to calcium hydroxide, was added in the synthesis of calcium carbonate by reaction of the slaked lime slurry and carbon dioxide gas and that the addition amounts of the surfactant (A) and the chelating agent (B) were changed to 18.5% and 2%, respectively. The physical properties of the obtained surface treated calcium carbonate powder are shown in Table 2.

Comparative Example 3

As Comparative Example, commercialized synthetic calcium carbonate used in Examples of JP-A No. 2002-264208 was used. The physical properties of the obtained powder are shown in Table 2.

Comparative Example 4

As Comparative Example, commercialized synthetic calcium carbonate (CUBE-18BHS, manufactured by Maruo Calcium Co., Ltd.) was used. The physical properties of the obtained powder are shown in Table 2.

Comparative Example 5

As Comparative Example, commercialized natural heavy calcium carbonate (MC-Coat S-20, manufactured by Chugoku Kogyo, Co., Ltd.) was used. The physical properties of the obtained powder are shown in Table 2.

Comparative Example 6

As Comparative Example, commercialized natural brucite (Magseeds W—H4, manufactured by Konoshima Chemical Co., Ltd.) was used. The physical properties of the obtained powder are shown in Table 2.

TABLE 1

|  |  | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Average particle diameter (μm) | $D_{50}$ | 0.4 | 0.7 | 0.7 | 0.6 | 1.4 | 0.6 | 0.8 | 0.9 | 0.6 | 0.6 |
| Coarse particles (μm) | Da | 2 | 3 | 4 | 15 | 16 | 2 | 17 | 18 | 3 | 17 |
| BET specific surface area (m²/g) | Sw | 12 | 35 | 12 | 12 | 12 | 12 | 12 | 12 | 12 | 12 |
| Volume resistivity (Ω·cm) | Ir | $8.1 \times 10^8$ | $3.2 \times 10^8$ | $2.8 \times 10^8$ | $8.5 \times 10^7$ | $1.0 \times 10^7$ | $1.1 \times 10^6$ | $7.3 \times 10^7$ | $1.7 \times 10^5$ | $5.4 \times 10^5$ | $1.3 \times 10^5$ |
| Inorganic particles |  | calcium carbonate | calcium carbonate | calcium carbonate | calcium carbonate | calcium carbonate | calcium carbonate | calcium carbonate | calcium carbonate | calcium carbonate | calcium carbonate |
| Surfactant (A) |  | surfactant | surfactant | surfactant | surfactant | surfactant | surfactant | surfactant | surfactant | surfactant | surfactant |
| Amount added (%) |  | 3.5 | 10 | 6.0 | 3.5 | 3.5 | 3.5 | 3.5 | 3.5 | 3.5 | 3.5 |
| Chelating compound (B) |  | sodium hexameta-phosphate | sodium hexameta-phosphate | sodium hexameta-phosphate | sodium hexameta-phosphate | sodium hexameta-phosphate | polyammonium acrylate | sodium hexameta-phosphate | sodium hexameta-phosphate | sodium hexameta-phosphate | sodium hexameta-phosphate |
| Amount added (%) |  | 1.2 | 1.5 | 1.5 | 1.2 | — | 1.2 | 1.2 | 1.2 | 1.2 | 1.2 |
| Heat loss (mg/m²) | As | 2.5 | 2.5 | 4.3 | 2.5 | 2.3 | 2.5 | 2.5 | 2.5 | 2.5 | 2.5 |
| Hydrochloric acid-insoluble matter (ppm) | Hx | 120 | 140 | 110 | 290 | 90 | 110 | 350 | 380 | 320 | 510 |
| Free carbon (ppm) | Fc | 0.1 | 0.5 | 0.3 | 0.9 | 4 | 14 | 0.5 | 15 | 24 | 28 |

TABLE 2

|  |  | Example 11 | Example 12 | Example 13 | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|---|---|
| Average particle diameter (μm) | $D_{50}$ | 1.47 | 1.32 | 0.7 | 0.6 | 1.4 | 0.6 | 1.7 | 1.4 | 2.0 |
| Coarse particles (μm) | Da | 12 | 19 | 16 | 18 | 37 | 22 | 16 | 18 | 31 |
| BET specific surface area (m²/g) | Sw | 12 | 58 | 15 | 12 | 63 | 14 | 2 | 2 | 7 |
| Volume resistivity (Ω·cm) | Ir | $7.9 \times 10^7$ | $5.8 \times 10^6$ | $8.8 \times 10^6$ | $8.5 \times 10^4$ | $5.0 \times 10^7$ | $2.0 \times 10^3$ | $7.5 \times 10^7$ | $1.3 \times 10^5$ | $7.8 \times 10^3$ |
| Inorganic particles |  | calcium carbonate | calcium phosphate | magnesium hydroxide | calcium carbonate | calcium carbonate | calcium carbonate | calcium carbonate | heavy calcium carbonate | brucite |
| Surfactant (A) |  | — | surfactant | surfactant | surfactant | surfactant | — | — | — | — |
| Amount added (%) |  | — | 15 | 4 | 3.5 | 18.5 | — | — | — | — |
| Chelating compound (B) |  | sodium hexameta-phosphate | sodium hexameta-phosphate | sodium hexameta-phosphate | — | sodium hexameta-phosphate | — | — | — | — |
| Amount added (%) |  | 1.2 | 2.0 | 1.2 | — | 2.0 | — | — | — | — |
| Heat loss (mg/m²) | As | 0.5 | 2.7 | 2.1 | 2.5 | 2.4 | — | — | — | — |
| Hydrochloric acid-insoluble matter (ppm) | Hx | 120 | 120 | 120 | 530 | 100 | 410 | 40 | 1200 | 6500 |
| Free carbon (ppm) | Fc | 0.5 | 4 | 0.5 | 33 | 0.7 | 41 | 3 | 62 | 53 |

Examples 14 to 26 and Comparative Examples 7 to 12

A polyethylene resin mixture was produced by mixing a polyethylene resin (Hi-zex Million 340 M, manufactured by Mitsui Chemicals, Inc.) and a polyethylene wax (Hi-wax 110P, manufactured by Mitsui Chemicals, Inc.) at a ratio of 7:3 and fed to a Henshel mixer in a manner that the volume ratio of each of the fine pore formation agents obtained in Examples 1 to 13 and Comparative Examples 1 to 6 to the resin mixture at 3:7, and the mixture was mixed for 5 minutes to obtain a composition for a porous resin film containing each fine pore formation agent and the resin.

The obtained composition was subjected to melting and kneading treatment and film formation by a biaxial kneader 2D25W provided with T-dies and manufactured by Toyo Seiki Co., Ltd. to obtain a film with a thickness of 80 µm. The obtained film was stretched about 5 times in the longitudinal direction at 110° C. in a tenter oven to obtain a porous resin film with a thickness of 20 µm.

The following properties 1) to 5) were evaluated for each porous resin film. The results are shown in Tables 3 and 4.

(Evaluation Methods)

1) Ion Permeability

The ion permeability was evaluated by measuring the electric conductivity of Li ions moving in the electrolytic solution.

The measurement was carried out by sandwiching and clamping the obtained porous film of the present invention (previously cut in a diameter of 47 mm) for fixation between a filter holder to be used for the filtration test and a 250 ml funnel in place of filtration paper or a filter, and the resulting unit was inserted in a 1 L-suction bottle filled with a mixed solution containing ethylene carbonate, ethyl methyl carbonate, and dimethyl carbonate at a volume ratio of 30:35:35, and separately 200 ml of an electrolytic solution obtained by dissolving $LiPF_6$ as an electrolytic substance in a concentration of 1 mol/L in the same mixed solution was poured in the funnel and the electric conductivity of the electrolytic solution in the suction bottle was measured after 30 minutes to measure the ion permeability. The results are shown in Tables 3 and 4. It can be said that the higher the electric conductivity, the higher the ion permeability and it is desirable.

2) Average Pore Diameter

The average fine pore diameter (µm) was measured using a porosimeter (9520 model, Shimadzu Corp.) based on a mercury pressurizing method according to JIS K1150. In terms of the electrolytic solution retention, the average particle diameter is preferably smaller than 0.1 µm.

3) Gurley Ventilation Degree

The Gurley value of each porous film was measured by B type densometer (manufactured by Toyo Seiki Co., Ltd.) according to JIS-P8117. The results are shown in Tables 3 and 4. The Gurley ventilation degree is generally in proportion to the fine pore diameter of the porous film and if there is a problem in the separator surface, the Gurley value becomes high and in the case pin holes are formed, the Gurley value is low and thus, the porous film state can be understood. Consequently, the range of the Gurley value is generally from 50 to 500 (s/100 ml) and preferably from 100 to 300 (s/100 ml). In the case the value is out of the above-mentioned range, there is possibly a problem.

4) Cycle Property of Lithium Secondary Battery

A mixture containing cathode active material ($LiMn_2O_4$) and a conductive agent (acetylene black) was used as a positive electrode and a metal Li applied in a thick layer to a Ni mesh was used as a negative electrode, and each of the porous films produced in Examples and Comparative Examples was sandwiched between the positive electrode and the negative electrode, and using a potentiostat/galvanostat (BTS 2004H, manufactured by NAGANO & CO., Ltd.), measurement was carried out. As an electrolytic solution, a $LiClO_4$ electrolytic solution (PC/DMC organic solvent) was used as and the rated current charge-discharge conditions were 0.9 mA and 3.5 to 4.3 V and 1000 measurement cycles.

The charge capacity and the discharge capacity at the first measurement cycle and the 1000th cycle are shown in Tables 5 to 8. As the capacity decrease during the cycles was lower, that is, as the retention ratio of the capacity at the 1000th cycle to the capacity of the first cycle [(the capacity at the 1000th cycle)/(the capacity of the first cycle)×100(%)] was higher, the battery separator was determined to be more excellent. The charge-discharge cycle property was evaluated according to the following standard and the results are shown in Tables 5 to 8.

5 points: extremely stable in charge-discharge capacity and capacity decrease, 4 points: stable in charge-discharge capacity and capacity decrease, 3 points: within allowable range of charge-discharge capacity and capacity decrease, 2 points: there is a problematic portion in charge-discharge capacity and capacity decrease, and 1 point: inferior in charge-discharge capacity and capacity decrease.

5) The Comprehensive Evaluation of Each Porous Film as the Battery Separator was Performed According to the Following Standard Based on the Results 1) to 4) and the Results are Shown in Tables 3 and 4.

A: excellent

B: good

C: satisfactory for practical use

D: there is a slight problem in quality, but no obstacle for practical use

E: high probability of occurrence of problems in practical use

F: defective

TABLE 3

| | Example 14 | Example 15 | Example 16 | Example 17 | Example 18 | Example 19 | Example 20 | Example 21 | Example 22 | Example 23 |
|---|---|---|---|---|---|---|---|---|---|---|
| | Fine pore formation agents used | | | | | | | | | |
| | Example 1 | Example 2 | Example 3 | Example 4 | Example 5 | Example 6 | Example 7 | Example 8 | Example 9 | Example 10 |
| 1) Ion permeability [µS/cm] | 850 | 730 | 720 | 790 | 760 | 720 | 710 | 700 | 750 | 760 |
| 2) Average pore diameter [µm] | 0.06 | 0.04 | 0.08 | 0.07 | 0.09 | 0.07 | 0.08 | 0.09 | 0.07 | 0.07 |
| 3) Gurley ventilation degree [sec./100 ml] | 150 | 300 | 230 | 280 | 210 | 150 | 90 | 300 | 420 | 470 |

TABLE 3-continued

|  | Example 14 | Example 15 | Example 16 | Example 17 | Example 18 | Example 19 | Example 20 | Example 21 | Example 22 | Example 23 |
|---|---|---|---|---|---|---|---|---|---|---|
|  | \multicolumn{10}{c}{Fine pore formation agents used} |
|  | Example 1 | Example 2 | Example 3 | Example 4 | Example 5 | Example 6 | Example 7 | Example 8 | Example 9 | Example 10 |
| 4) Cycle property | 5 | 4 | 4 | 4 | 4 | 3 | 4 | 3 | 3 | 3 |
| 5) Comprehensive evaluation as a battery separator | A | B | B | B | B | C | C | C | D | D |

TABLE 4

|  | Example 24 | Example 25 | Example 26 | Comp. Ex. 7 | Comp. Ex. 8 | Comp. Ex. 9 | Comp. Ex. 10 | Comp. Ex. 11 | Comp. Ex. 12 |
|---|---|---|---|---|---|---|---|---|---|
|  | \multicolumn{9}{c}{Fine pore formation agents used} |
|  | Example 11 | Example 12 | Example 13 | Comp. Ex. 1 | Comp. Ex. 2 | Comp. Ex. 3 | Comp. Ex. 4 | Comp. Ex. 5 | Comp. Ex. 6 |
| 1) Ion permeability [μS/cm] | 600 | 650 | 780 | 450 | 380 | 480 | 400 | 300 | 350 |
| 2) Average pore diameter [μm] | 0.09 | 0.09 | 0.07 | 0.10 | 0.12 | 0.12 | 0.11 | 0.14 | 0.12 |
| 3) Gurley ventilation degree [sec./100 ml] | 250 | 80 | 90 | 530 | 630 | 510 | 40 | 1300 | 2100 |
| 4) Cycle property | 4 | 4 | 4 | 2 | 2 | 2 | 2 | 1 | 1 |
| 5) Comprehensive evaluation as a battery separator | B | C | C | E | E | E | E | F | F |

TABLE 5

| | Example 14 | | | Example 15 | | | Example 16 | | | Example 17 | | | Example 18 | | |
|---|---|---|---|---|---|---|---|---|---|---|---|---|---|---|---|
| | \multicolumn{15}{c}{Fine pore formation agents used} |
| | Example 1 | | | Example 2 | | | Example 3 | | | Example 4 | | | Example 5 | | |
| | 1 cycle | 1000 cycle | retention ratio (%) | 1 cycle | 1000 cycle | retention ratio (%) | 1 cycle | 1000 cycle | retention ratio (%) | 1 cycle | 1000 cycle | retention ratio (%) | 1 cycle | 1000 cycle | retention ratio (%) |
| Charge capacity (mAh·g$^{-1}$) | 120 | 114 | 95 | 120 | 106 | 88 | 120 | 105 | 88 | 107 | 96 | 90 | 120 | 105 | 88 |
| Discharge capacity (mAh·g$^{-1}$) | 119 | 110 | 92 | 117 | 100 | 85 | 117 | 100 | 85 | 104 | 95 | 91 | 117 | 101 | 86 |
| Cycle property | \multicolumn{3}{c|}{5} | \multicolumn{3}{c|}{4} | \multicolumn{3}{c|}{4} | \multicolumn{3}{c|}{4} | \multicolumn{3}{c}{4} |

TABLE 6

| | Example 19 | | | Example 20 | | | Example 21 | | | Example 22 | | | Example 23 | | |
|---|---|---|---|---|---|---|---|---|---|---|---|---|---|---|---|
| | \multicolumn{15}{c}{Fine pore formation agents used} |
| | Example 6 | | | Example 7 | | | Example 8 | | | Example 9 | | | Example 10 | | |
| | 1 cycle | 1000 cycle | retention ratio (%) | 1 cycle | 1000 cycle | retention ratio (%) | 1 cycle | 1000 cycle | retention ratio (%) | 1 cycle | 1000 cycle | retention ratio (%) | 1 cycle | 1000 cycle | retention ratio (%) |
| Charge capacity (mAh·g$^{-1}$) | 120 | 95 | 79 | 120 | 102 | 85 | 106 | 82 | 77 | 120 | 92 | 77 | 105 | 76 | 72 |
| Discharge capacity (mAh·g$^{-1}$) | 117 | 90 | 77 | 117 | 96 | 82 | 96 | 72 | 75 | 104 | 81 | 78 | 98 | 71 | 72 |
| Cycle property | \multicolumn{3}{c|}{3} | \multicolumn{3}{c|}{4} | \multicolumn{3}{c|}{3} | \multicolumn{3}{c|}{3} | \multicolumn{3}{c}{3} |

TABLE 7

| | Example 24 | | | Example 25 | | | Example 26 | | | Comp. Ex. 7 | | |
|---|---|---|---|---|---|---|---|---|---|---|---|---|
| | Fine pore formation agents used | | | | | | | | | | | |
| | Example 11 | | | Example 12 | | | Example 13 | | | Comp. Ex. 1 | | |
| | 1 cycle | 1000 cycle | retention ratio (%) | 1 cycle | 1000 cycle | retention ratio (%) | 1 cycle | 1000 cycle | retention ratio (%) | 1 cycle | 1000 cycle | retention ratio (%) |
| Charge capacity (mAh·g$^{-1}$) | 110 | 91 | 83 | 102 | 86 | 84 | 106 | 90 | 85 | 112 | 76 | 68 |
| Discharge capacity (mAh·g$^{-1}$) | 105 | 86 | 82 | 96 | 80 | 83 | 103 | 86 | 83 | 111 | 72 | 65 |
| Cycle property | 4 | | | 4 | | | 4 | | | 2 | | |

TABLE 8

| | Comp. Ex. 8 | | | Comp. Ex. 9 | | | Comp. Ex. 10 | | | Comp. Ex. 11 | | | Comp. Ex. 12 | | |
|---|---|---|---|---|---|---|---|---|---|---|---|---|---|---|---|
| | Fine pore formation agents used | | | | | | | | | | | | | | |
| | Comp. Ex. 2 | | | Comp. Ex. 3 | | | Comp. Ex. 4 | | | Comp. Ex. 5 | | | Comp. Ex. 6 | | |
| | 1 cycle | 1000 cycle | retention ratio (%) | 1 cycle | 1000 cycle | retention ratio (%) | 1 cycle | 1000 cycle | retention ratio (%) | 1 cycle | 1000 cycle | retention ratio (%) | 1 cycle | 1000 cycle | retention ratio (%) |
| Charge capacity (mAh·g$^{-1}$) | 120 | 65 | 54 | 113 | 46 | 41 | 120 | 80 | 67 | 106 | short circuit on the way | — | 106 | short circuit on the way | — |
| Discharge capacity (mAh·g$^{-1}$) | 116 | 53 | 46 | 110 | 42 | 38 | 116 | 50 | 43 | 101 | short circuit on the way | — | 101 | short circuit on the way | — |
| Cycle property | 2 | | | 2 | | | 2 | | | 1 | | | 1 | | |

INDUSTRIAL APPLICABILITY

The fine pore formation agent for a porous film of the present invention is, since the inorganic particles composing the agent are almost free from coarse particles, characterized in that the strength of the porous resin film is hardly deteriorated, that the distribution width of the pore diameter of the porous resin film is made uniform and the pore diameter can be controlled, and that conductive impurities are extremely slight. Accordingly, a resin composition suitable for providing a porous resin film usable for electric parts such as capacitors and battery separators is provided by mixing the fine pore formation agent with a resin.

The invention claimed is:

1. A fine pore formation agent for porous resin films containing inorganic particles, wherein the inorganic particles satisfy the following formulas (a) to (d) and (f):

$0.1 \leq D50 \leq 1.5 (\mu m)$;  (a)

$Da \leq 20 (\mu m)$;  (b)

$3 \leq Sw \leq 60 (m^2/g)$; and  (c)

$Ir \geq 1.0 \times 10^5 (\Omega \cdot cm)$  (d)

$H_x \leq 500 (ppm)$  (f)

wherein
D50: average particle diameter (μm) of particles in 50% cumulative total by weight from the larger particle side in particle size distribution by laser diffraction spectrometry (micro-track FRA);
Da: maximum particle diameter (μm) in the particle size distribution by laser diffraction spectrometry (micro-track FRA);
Sw: BET specific surface area (m$^2$/g) measured by nitrogen adsorption method; and
Ir: volume resistivity (Ω·cm) of hydrochloric acid-insoluble matter; and
$H_X$: hydrochloric acid-insoluble matter contained in 500 g of the fine pore formation agent.

2. The fine pore formation agent for porous resin films according to claim 1, wherein the inorganic particles are selected from calcium carbonate, calcium phosphate, magnesium hydroxide, and barium sulfate.

3. The fine pore formation agent for porous resin films according to claim 1, wherein the inorganic particles are calcium carbonate.

4. The fine pore formation agent for porous resin films according to claim 1, wherein the inorganic particles are surfaced treated with a surfactant (A) and a compound (B) having a chelating function to alkaline earth metals.

5. The fine pore formation agent for porous resin films according to claim 1, wherein the inorganic particles satisfy the following formula (e):

$1 \leq As \leq 4 (mg/m^2)$  (e)

wherein
As: heat loss per unit specific surface area calculated according to the following equation [heat loss per 1 g of surface treated inorganic particles at a temperature in a range from 200° C. to 500° C. (mg/g)]/Sw (m$^2$/g).

6. The fine pore formation agent for porous resin films according to claim 1, wherein the inorganic particles satisfy the following formula (g):

$Fc \leq 30 (ppm)$  (g)

wherein
  Fc: hydrochloric acid-insoluble free carbon contained in 500 g of the fine pore formation agent.

7. A composition for a porous resin film which comprises mixing the fine pore formation agent according to claim 1 with a resin for a porous film.

8. The composition for a porous resin film according to claim 7, wherein the resin for a porous film is an olefin type resin.

9. A battery comprising:
two electrodes, and
a porous resin film made of the composition for a porous resin film according to claim 7, positioned between the electrodes.

* * * * *